United States Patent [19]

Onodera et al.

[11] Patent Number: 4,884,154
[45] Date of Patent: Nov. 28, 1989

[54] FLANGED TRANSDUCER SUPPORTING ARM FOR A MAGNETIC HEAD/ARM ASSEMBLY

[75] Inventors: Shuji Onodera; Taichi Sato, both of Ibaraki; Kihachiro Tanaka, Ushiku; Yokuo Saitoh, Kanagawa; Hiroshi Daito, Odawara; Yoko Yamada, Tokyo; Yuzo Yamaguchi, Tsuchiura; Yoshinori Takeuchi, Ibaraki; Shigeo Hara, Kanagawa; Shouichi Setone, Ebina, all of Japan

[73] Assignee: Hitachi, Ltd., Tokyo, Japan

[21] Appl. No.: 97,170

[22] Filed: Sep. 16, 1987

[30] Foreign Application Priority Data

Sep. 19, 1986 [JP] Japan ................................ 61-219511

[51] Int. Cl.⁴ .............................................. G11B 5/48
[52] U.S. Cl. .................................................. 360/104
[58] Field of Search ................ 360/104, 103, 105, 106

[56] References Cited

U.S. PATENT DOCUMENTS 4,167,765  9/1979  Watsons ............................. 360/103
4,723,186  2/1988  Nakajima et al. .................. 360/104
4,774,610  9/1988  Kinjo ................................. 360/104

FOREIGN PATENT DOCUMENTS 0121057  10/1984  European Pat. Off. ............ 360/104
0208280   1/1987  European Pat. Off. ............ 360/106
0074170   4/1985  Japan ................................. 360/103
0136979   7/1985  Japan ................................. 360/104

Primary Examiner—Stuart N. Hecker
Assistant Examiner—David J. Severin
Attorney, Agent, or Firm—Antonelli, Terry & Wands

[57] ABSTRACT

The invention designed to improve the precision in determining the position of the magnetic head and to enable more stable maintenance of the gap between the transducer and the recording disk is characterized in that the flange provided to the transducer supporting arm is made lower in height on the rigid arm side than on the magnetic head side.

6 Claims, 6 Drawing Sheets

FLANGED TRANSDUCER SUPPORTING ARM FOR A MAGNETIC HEAD/ARM ASSEMBLY

The present invention relates to a magnetic head/arm assembly used for storing and retrieving data in magnetic storage devices.

BACKGROUND OF THE INVENTION

In magnetic disk equipment, as the recording disk rotates with the magnetic head or transducer pressed against it, the magnetic head floats about 0.5 μm above the recording disk surface. Thus, for the magnetic head to approach and follow the recording disk surface with a specified gap therebetween, the magnetic head needs to be supported in the directions of gap, pitching and rolling with sufficient elasticity or resiliency while at the same time it should also be supported in the directions of disk rotation, access and yawing with sufficient rigidity. A magnetic head/arm assembly that meets the above requirements and which has a flange on each side to increase the rigidity of the transducer supporting arm is found, for example, in the U.S.P. 4,167,765 or Japanese Utility Model Application Laid-Open No. 161543/1984.

With the magnetic disk equipment of recent years having sharply increased capacity, however, there are growing and more stringent demands for higher accuracy in determining the magnetic head position on the recording disk track and for more stable maintenance of the gap between the magnetic head and the recording disk. It is therefore necessary to consider the effect the wind produced by the rotation of the recording disk has on the transducer supporting arm. However, no consideration has been made so far as to the effect when the flange of the transducer supporting arm is subjected to the wind produced by the rotating recording disk.

SUMMARY OF THE INVENTION

The object of this invention is to provide a magnetic head/arm assembly which has a higher transducer positioning accuracy and also is capable of a more stable maintenance of the gap between the transducer and the disk, by making improvements on the transducer supporting arm flange subject to the wind produced by the rotating recording disk.

The above objective is achieved by forming the flange provided to the transducer supporting arm in such a manner that the part of the flange on the rigid arm side is made lower than that on the magnetic head side.

DESCRIPTION OF THE ILLUSTRATED EMBODIMENTS

Figure 1:
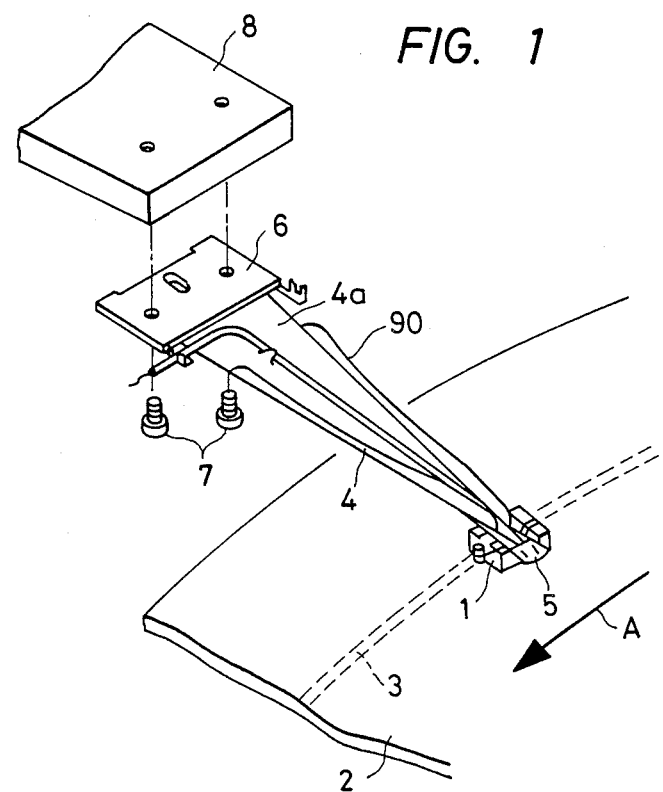
FIG. 1 is a perspective view of the magnetic head/-arm assembly representing one embodiment of this invention.

One embodiment of this invention is described by referring to FIG. 1. In FIG. 1, reference numeral 1 denotes a magnetic head or transducer to write and read information to and from the track 3 on the recording disk 2 that rotates in the direction of arrow A. 4 designates a magnetic head supporting arm or transducer supporting arm 4. The magnetic head 1 is supported on the front end of the support arm 4 through an elastic member 5. The transducer supporting arm 4 has its base fixed by screws 7 to a rigid arm 8 through a spacer 6. The rigid arm 8 is mounted to a drive unit (not shown) which activates the magnetic head 1 for accessing information on the disk 2. The transducer supporting arm 4 has flanges 90 rising at each side edge to increase the rigidity of the arm 4. The flange 90 is formed by bending the edges of the arm 4 on each side. In this magnetic head/arm assembly, the flanges 90 which increase the rigidity of the magnetic head supporting arm 4 are so formed that the height of the flanges 90 on the side of the rigid arm 8 is made smaller than that on the magnetic head side to make the area of the flange on the base side or on the rigid arm side smaller than the area on the magnetic head side.

In this embodiment, when the flange 90 on the transducer supporting arm 4 is subjected to a wind produced by the rotation of the recording disk 2, the force the wind exerts on the flange area on the rigid arm side is smaller than the force applied on the flange area on the magnetic head side because the former area is smaller than the latter area. This results in a reduced head vibration in the radial direction of the arm 4 in the torsional vibration mode and the bending vibration mode. It also contributes to higher precision in determining the position of the transducer and to more stable maintenance of the gap between the transducer and the recording disk.

Figure 2:
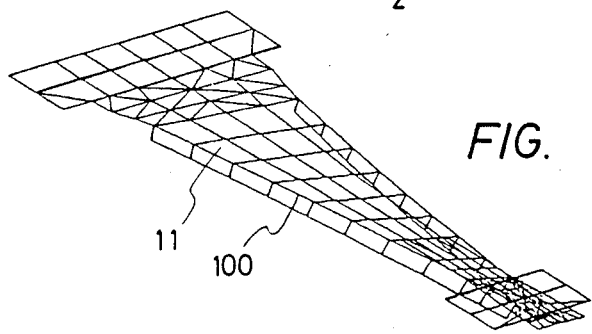
FIG. 2 is a diagram showing the torsional vibration mode of the magnetic head or transducer supporting arm.
Figure 3:
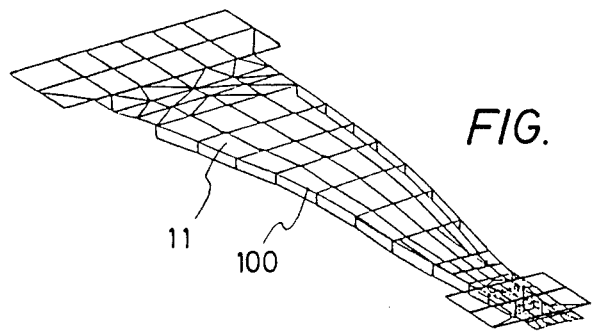
FIG. 3 is a diagram showing the bending vibration mode of the transducer supporting arm.
Figure 4:
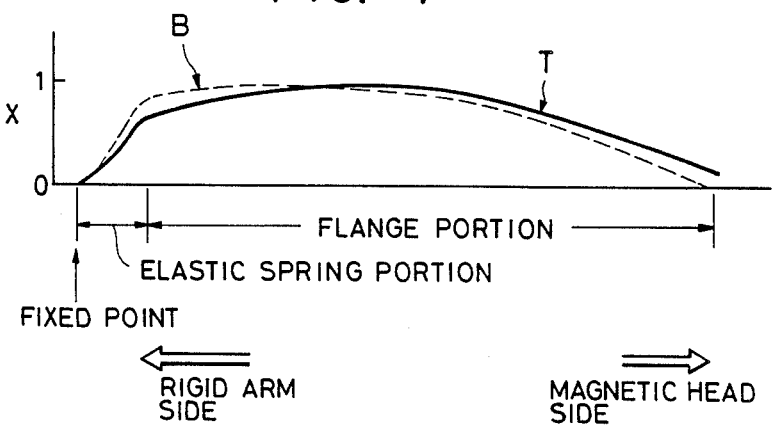
FIG. 4 is a diagram showing the vibratory displacement of the flange.

Now, we will explain how the height of the flange 90 is made to vary along the length of the transducer supporting arm 4 by using the relation between the vibration mode of the magnetic head/arm assembly and the wind force to which the assembly is subjected. The conventional magnetic head/arm assembly, when subjected to wind, vibrates in a torsional vibration mode as shown in FIG. 2 and in a bending vibration mode as shown in FIG. 3. FIG. 4 shows the vertical displacement X of a boundary line 100 defined between the triangular flat portion 11 of the transducer supporting arm 4 and the flange 90 during each of the vibratory modes (B represents the bending vibration mode; T represents the torsional vibration mode). In FIG. 4, the maximum displacement is taken as 1. It is seen that the magnitude of vertical displacement is large in a region ranging from the central part of the flange toward the rigid arm and decreases toward the magnetic head.

Figure 5:
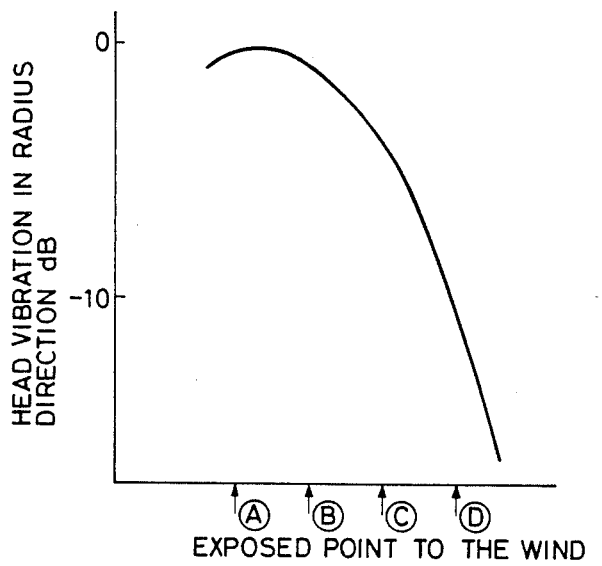
FIG. 5 is a graph showing the relation between the flange position and the head vibration.
Figure 6:
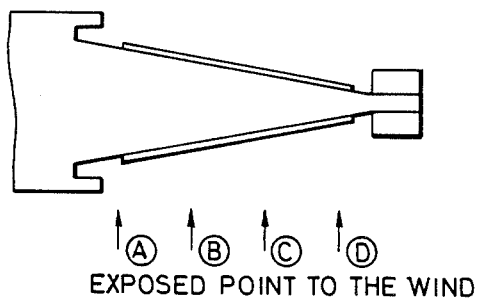
FIG. 6 is a diagram showing the points on the flange where the flange is subjected to the wind produced by the rotating disk.

We have experimented with the magnetic head/arm assembly with flanges which are constant in height along the length from the magnetic head to the rigid arm to investigate how the head vibration changes with the position on the flange subjected to the wind, during the torsional vibration mode. FIG. 5 shows the result of the experiment with the ordinate representing the head vibration in radial direction and the abscissa representing the position on the transducer supporting arm to which wind is directed. This diagram shows that the wind, when applied to the area of position A and B, i.e., to the flange area on the rigid arm side, produces a large head vibration. In other words, from FIG. 4 and the experiment result, it can be said that when wind is directed to the area where the vibratory displacement is large, the head vibration is also large.

If, however, some measures are taken to reduce the force exerting on the flange area near the rigid arm where the transducer displacement is large during such a vibration mode, the head vibration will be reduced. Now, we will determine the shape of the flange which satisfies the condition that the product of the vertical vibratory displacement X at each position and the external force F applied to that point is constant. That is, $$F \cdot X = \text{constant} \quad (1)$$

Figure 7:
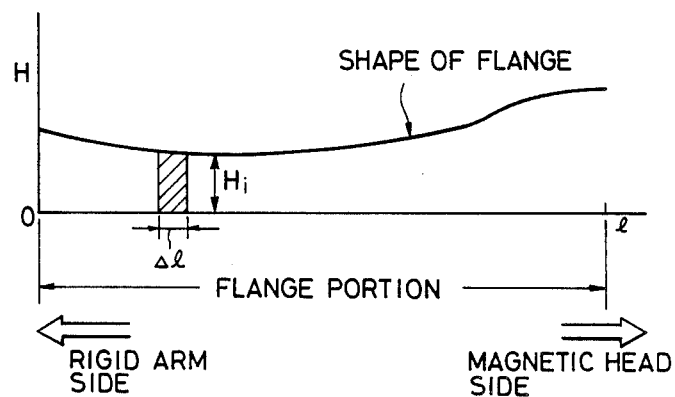
FIG. 7 is a diagram showing the shape of flange in relation to the flange position.

Suppose the height H of flange varies with the length l as shown in FIG. 7. When the flange is put in a uniform flow of fluid with fluid velocity v so that it is perpendicular to the flow of the fluid, the fluid force (external force) exerted on a very small area (shaded part in the figure) is given by $$F_i = C_{Di} (\tfrac{1}{2} \rho v^2 H_i \Delta l) \quad (2)$$

where $\rho$ is a fluid density; $C_D$ is a drag coefficient; and i is a suffix representing a number of each very small area which is obtained by equally dividing the flange length l by n. For each very small area with i =1 to n, $\rho$, v and $\Delta l$ are constant. Although $C_{Di}$ varies for each very small area, (1) the value $H_i/\Delta l$ does not change greatly for different areas and (2) if $H_i/\Delta l$ should change largely from 1 to 10, $C_{Di}$ remains almost the same in the range of 1.12 to 1.29. Considering these two facts, $C_{Di}$ is almost constant for all very small areas. Thus, $$F_i = A H_i \quad (3)$$

$$(A = C_{Di} \tfrac{1}{2} \rho v^2 \Delta = \text{constant})$$

From expression (1) and (3), we get $$H_i X_i = \text{constant} \quad (4)$$

$X_i$ considers the area number i of X of the expression (1).

In other words, if the flange height is made inversely proportional to the vertical vibratory displacement at each position in FIG. 4, then it is possible to reduce the fluid force and therefore the head vibration. Note, however, that where the vibratory displacement is zero or very close to zero, the flange height becomes too large to be realized in the actual magnetic head/arm assembly. Thus, it may be possible to set the flange height to a certain constant value where the vertical vibratory displacement is smaller than a specified value (say, X<0.5). The flange shape thus determined is shown in FIG. 7. The detailed shapes of flange such as rounding of edges and corners or other general machining given to flanges are not included in our discussion.

The above first embodiment (FIGS. 1,7) has a great advantage in reducing the fluid force to which the flange is subjected. However, where the use of the above flange shape reduces the natural frequency of the magnetic head/arm assembly or where the fluid force is small as with a small magnetic disk equipment, the flange shape needed to be determined considering the vibrational characteristic of the magnetic head/arm assembly.

Figure 8:
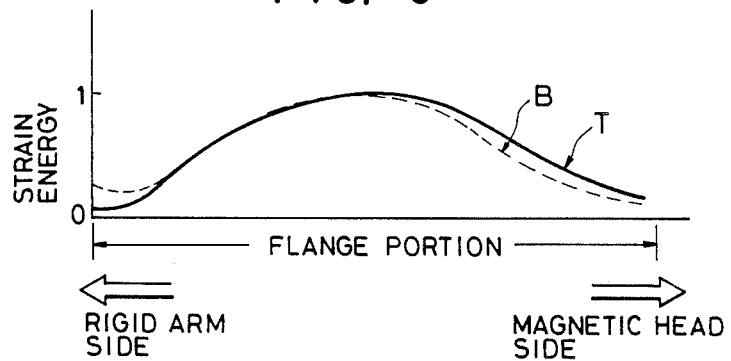
FIG. 8 is a graph showing the relationship between the flange position and the strain energy in the conventional magnetic head/arm assembly.
Figure 9:
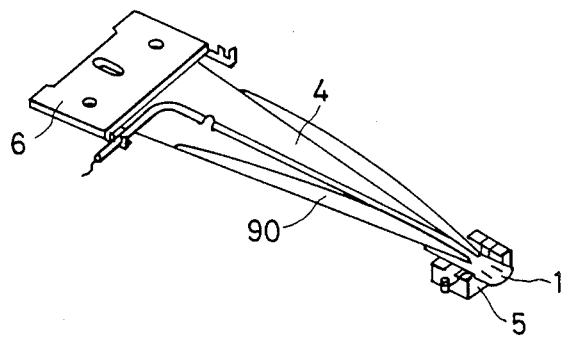
FIG. 9 shows another embodiment of this invention.

FIG. 8 shows the strain energy (the maximum value is taken as 1) at each position on the flange of the conventional magnetic head/arm assembly during the torsional and bending vibration mode. In either of the torsional vibration mode (indicated by "T" in the figure) and the bending vibration mode (indicated by "B"), it is seen that the strain energy is large near the central portion, lengthwise, of the flange. That is, if the flange height is constant along the flange length as with the conventional magnetic head/arm assembly, the strain energy is not uniform along the length as shown in the figure. This is not desirable in respect of vibrational characteristic. To improve this condition, the height of the flange where the strain energy is large is increased to give a greater rigidity to the flange. In other words, the flange is shaped as shown in FIG. 9 (second embodiment) in which the flange is higher at the central part than on the rigid arm side and the magnetic head side.

If the flange is shaped by considering the first and second embodiments described above, it is possible to obtain a magnetic head/arm assembly which has substantial improvements with respect to the fluid force and the vibrational characteristic. In Table 1 we summarize the rough height of the flange at three flange portions—rigid arm side, central portion and magnetic head side—for each embodiment.

TABLE 1

| | | Flange height | | |
|---|---|---|---|---|
| | Purpose | Rigid arm side | Central portion | Magnetic head side |
| First embodiment | To reduce the fluid force | Low | Low | High |
| Second embodiment | To improve the vibrational characteristic | Low | High | Low |
| Third embodiment | To consider the above two items | Low | High | Low |

Figure 10:
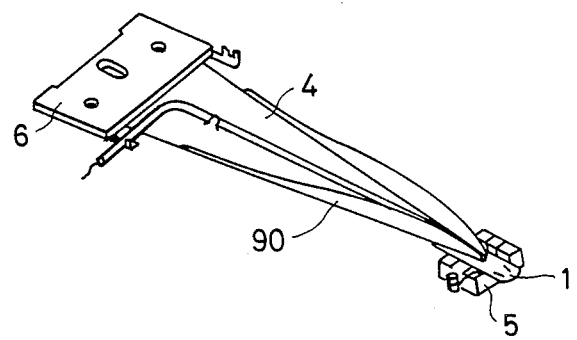
FIG. 10 shows the third embodiment of this invention.
Figure 11:
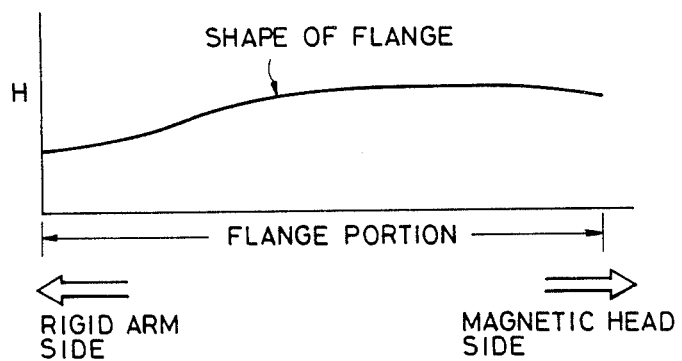
FIG. 11 is a graph showing the relationship between the flange position and the flange height.

The third embodiment of the magnetic head/arm assembly has the flange height on the rigid arm side relatively smaller than on the magnetic head side as shown in FIG. 10 (FIG. 11).

Figure 12:
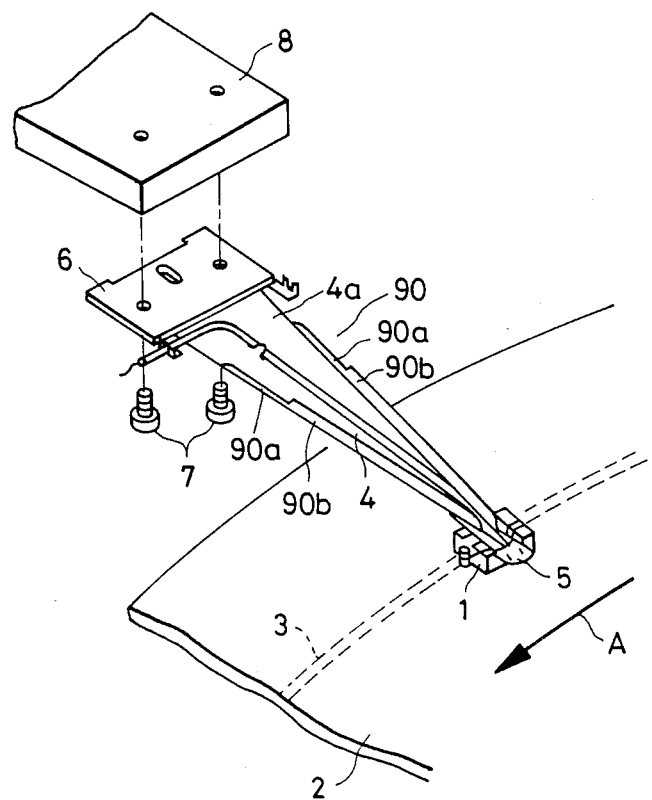
FIG. 12 shows the fourth embodiment of this invention.
Figure 13:
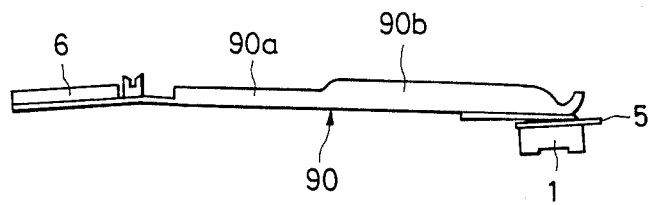
FIG. 13 is a side view of the transducer supporting arm as shown in FIG. 12.

The preceding embodiments consider the characteristics of the magnetic head/arm assembly a primary importance and their flanges have a smooth curve which may pose some difficulties in terms of manufacturing technique. The manufacture process, however, may be simplified if, as shown in FIG. 12 (the fourth embodiment) and FIG. 13 (side view of FIG. 12), the flange is formed with a step between the rigid arm side and the magnetic head side, with the heights at each section of the flange made constant.

Figure 14:
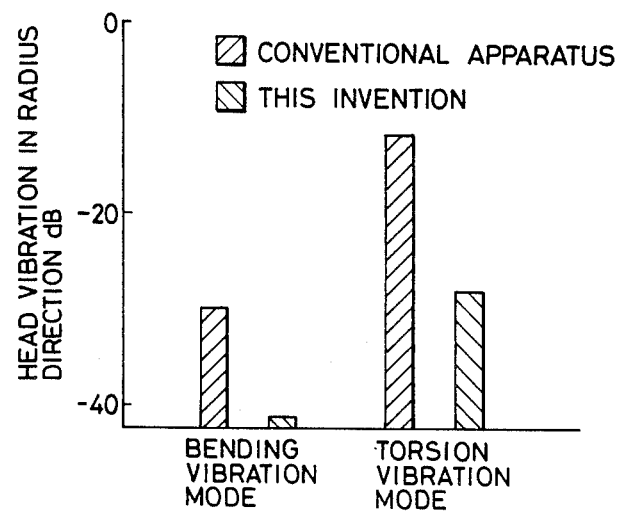
FIG. 14 is a graph showing the comparison in the head vibration between the conventional apparatus and this invention during the bending and torsional vibration modes.

FIG. 14 shows the head vibration (dB) of this invention during each vibration mode, as compared with that of the conventional apparatus. As seen from this figure, the magnetic head/arm assembly of this invention has a smaller head vibration.

Figure 15:
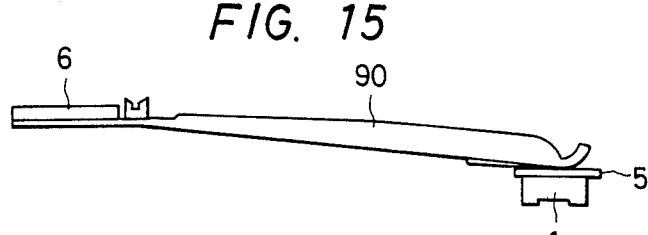
FIGS. 15, 16 and 17 show further embodiments of this invention.
Figure 16:
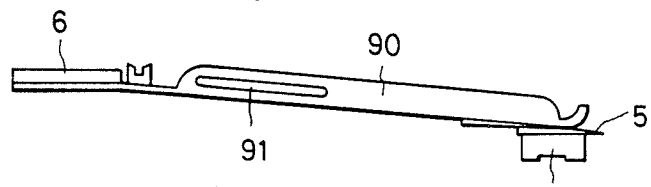
Figure 17:
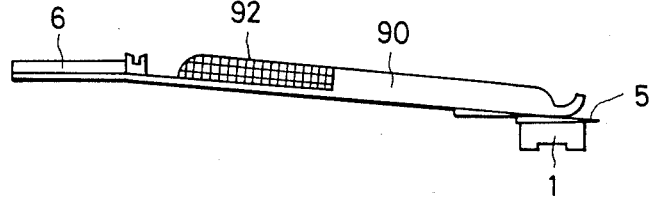

FIG. 15 shows another embodiment of this invention. FIG. 15 shows the height of the flange 90 reducing or tapered off toward the rigid arm side to make the flange area on the rigid arm smaller than the flange area on the magnetic head side. FIG. 16 shows a slot 91 formed in the flange on the rigid arm to make the flange area on the rigid arm smaller than the flange area on the magnetic head side. FIG. 17 shows a mesh 92 provided at the flange 90 on the rigid arm side to make the flange area on the rigid arm side smaller than the flange area on the magnetic head side.

As mentioned in the foregoing, with this invention the flange area on the rigid arm side of the transducer supporting arm is made smaller than the flange area on the magnetic head side to reduce the wind force exerted on the flange area on the rigid arm side and therefore reduce the head vibration in radial direction during the torsional vibration mode and the bending vibration mode, thus improving the precision in determining the transducer position and permitting the more stable maintenance of the gap between the transducer and the recording disk.

We claim:

1. A transducer supporting arm for use in a magnetic head/arm assembly, comprising a front end for supporting a magnetic transducer, a rear end for mounting to a drive unit of the assembly, side edges between the front end and the rear end, and flanges provided along the side edges, wherein the flanges comprise first flanges of one height extending from the rear end toward the front end to an intermediate position, and second flanges of a second height greater than the one height extending from the front end toward the rear end to the intermediate position, and a step joining each of the first flanges with the respective second flanges at the intermediate position.

2. A transducer supporting arm according to claim 1, wherein a top surface of the first flanges and a top surface of the second flanges are parallel to each other.

3. A transducer supporting arm according to claim 1, wherein the heights of the first and second flanges are constant.

4. A transducer supporting arm for use in a magnetic head/arm assembly, comprising a front end for supporting a magnetic transducer, a rear end for mounting to a drive unit of the assembly, side edges between the front end and the rear end, and flanges provided along the side edges having a height which varies along the arm from substantially the rear end to the front end, wherein the flanges are higher in a central portion than at ends thereof.

5. A transducer supporting arm according to claim 4, wherein the flanges increase in height from the front end toward the central portion in a continuous manner and decrease in height from the central portion toward the rear end in a continuous manner.

6. A transducer supporting arm for use in a magnetic head/arm assembly, comprising a front end for supporting a magnetic transducer, a rear end for mounting to a drive unit of the assembly, side edges between the front end and the rear end, and flanges provided along the side edges having a height which varies along the arm from substantially the rear end to the front end, wherein the height of the flanges tapers downwardly from the front end to the rear end.

* * * * *